April 16, 1940. E. H. BAILEY 2,197,372
ELECTRIC LIGHT IN ARTIFICIAL LURE OR BAIT
Filed Sept. 26, 1938
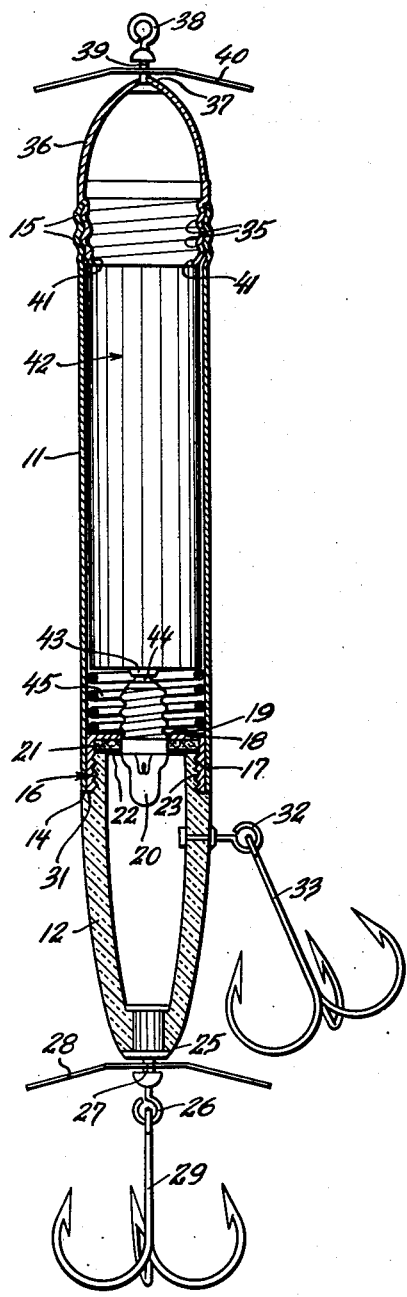
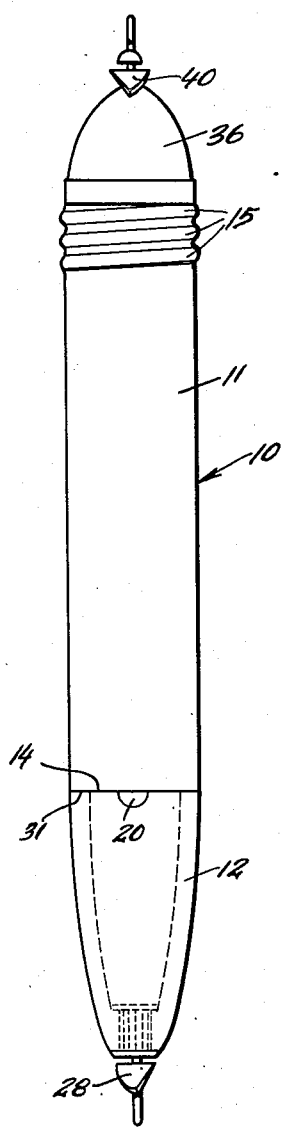
Inventor
Eugene H. Bailey
By Carl Miller
Attorney Patented Apr. 16, 1940

2,197,372

UNITED STATES PATENT OFFICE 2,197,372

ELECTRIC LIGHT IN ARTIFICIAL LURE OR BAIT

Eugene H. Bailey, Artesia, Miss.

Application September 26, 1938, Serial No. 231,739

4 Claims. (Cl. 43—44)

This invention relates to fishing lures and artificial fish baits.

The principal object of this invention is to provide a lure or bait having a transparent head in which is housed an electric light bulb that receives current from a battery carried within the body of the lure or bait, and so constructed that connection between the battery and bulb may be made or broken by adjustably manipulating an end cap provided on the end of the body of the line or bait opposite the transparent head, whereby the illuminating of the transparent head will attract fish.

A further object is to construct the lure or bait and arrange the electric light bulb and battery therein so as to obviate the use of electric wire connections.

The invention will be best understood from a consideration of the following detailed description taken in connection with the accompanying drawing forming part of this specification, with the understanding, however, that the invention is not confined to any strict conformity with the showing of the drawing that may be changed or modified so long as such changes or modifications mark no material departure from the salient features of the invention as expressed in the appended claims.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims:

In the accompanying drawing, in which is shown one of the various possible illustrative embodiments of this invention:

Figure 1 is a longitudinal sectional view of the lure or bait embodying the present invention, and Figure 2 is a view in side elevation of the lure or bait.

Referring now more particularly to the drawing wherein like numerals of reference indicate corresponding parts throughout the several views, the numeral 10 indicates generally the lure or bait embodying the present invention which comprises a cylindrical body 11, a transparent head 12 and an end cap 13. The cylindrical body 11 consists of tubular metallic shell of any desired thickness one end 14 of which is ground straight so as to lie in a plane normal to the axis of the body 11, the other end being formed to provide a threaded end portion 15. The cylindrical body or shell 11 is preferably formed of aluminum although any other suitable material may be employed.

Disposed within the unthreaded end of the shell 11 is a metallic cup 16 having a cylindrical wall 17 in friction tight engagement with the inside of the shell 11, and a bottom wall 18 provided with a central opening 19 through which is adapted to be threaded an electric light bulb 20. Seated within the cup 16 is a centrally perforated washer 21 of cork or any other suitable material the face of which is covered by a layer of metal foil 22 to provide a reflecting surface, the washer 21 encircling the bulb 20 and serving to hold the same steady as well as to absorb any shocks or jolts that may be transmitted to the bulb when the lure or bait is in use. The inside wall surface of the cup 16 is interiorly threaded as at 23 and the dimensions of the cup 16 being such that the same is assembled with the shell 11 by means of a press-fit whereby the bottom wall 16 of the cup 16 actually forms an abutment or partition.

The forward end of the lure or bait 10 comprises a hollow transparent head 12 which is of bullet-shape tapering to a relatively long point 25, said head being made of celluloid, glass or any other suitable transparent material. Rigidly secured within the point 25 in any desired manner and by a water-tight connection therewith is an eye bolt 26 having an extended shank 27 on which is mounted a spinner 28, said eye-bolt carrying also the hooks 29. The base of the transparent head 12 is formed to provide a threaded portion 30 of reduced diameter defining a shoulder 31, said threaded portion being adapted to be threaded within the cup 16 into abutting engagement with the washer 21, and with the shoulder 31 tightly contacting the end 14 of the shell 11, to thus provide a water tight connection between the shell 11 and head 12. If desired the transparent head 12 may be further provided with an eye 32 to carry additional hooks 33.

The threaded end 15 of the shell 11 is adapted to receive in friction tight engagement a mating threaded portion 35 of an end cap 36 formed of like metallic material as the shell 11, said end cap 36 being formed also of bullet shape but tapering to provide a relatively blunt point 37 in which is secured by a water-tight connection an eye bolt 38 having an extended shank 39 on which is mounted a spinner 40. The outermost end 41 of the threaded portion 35 is tapered so as to provide an abutment for the base of a battery cell 42 which is to be placed within the shell 11.

With the battery 42 placed within the shell 11 the terminal 43 of the battery will be in axial alignment with the contact 44 of the bulb 20, and being normally held separated therefrom by a coil spring 45 one end of which is seated on the partition or base 18 of the cup 16, while the other end engages the terminal end of the battery 42, the spring 45 being of sufficient strength to hold the battery in spaced relation to the bulb contact 44 when the end cap 36 is turned outwardly of the shell 11 so as to allow a spaced relation between the terminal 43 and contact 44. With the parts in such normal position the transparent head 12 is not illuminated, and the lure or bait may be used in the conventional manner as an ordinary lure or bait.

With the cap 36 turned inwardly into the shell 11 to its innermost position so as to bring the battery terminal 43 into contact with the contact 44 of the bulb 20, as clearly shown in Figure 1, the bulb 20 will be lit to illuminate the transparent head 12, thus rendering the lure or bait operative as an illuminated lure or bait, it being well established and a well known fact among anglers that fish, especially game fish, have a peculiar affinity for light, and scintillating objects, in this case created by the reflection of the light on the spinners, which are known to lure where ordinary bait fails to attract. It will be apparent that the cap 36 serves as a switch to control the lighting of the bulb 20.

From the above it will be seen that a fish lure or bait is provided, which is illuminated, and one wherein the light is projected through a transparent head and towards hooks carried thereby. It will also be seen that the device is simple in construction and the parts reduced to a minimum.

Having thus described my invention, I claim as new and desire to secure by Letters Patent:

1. An illuminated fish lure or bait comprising a shell, an elongated transparent hollow head removably attached to one end thereof, a shock absorbing washer clamped between said shell and transparent head, an electric light bulb carried by said shock absorbing washer and projecting partly into said transparent head, a battery within said shell, spring means normally holding said battery separated from said bulb, an elongated tapered end cap threadedly mounted within the other end of said shell adapted to engage the base of said battery, said cap upon a predetermined inward movement relative to said shell being adapted to move said battery into operative contact with said bulb to energize the same whereby to illuminate said transparent head, hook and spinner means attached to said transparent head, and a line attaching means connected to the tapered end of said end cap.

2. An illuminated fish lure or bait comprising a cylindrical shell, a cap inserted into one end of said shell in fixed relation thereto, said cap having a bottom wall defining a partition, a transparent head threadedly attached to said cap, an electric light bulb carried by said partition, a non-metallic shock absorbing washer surrounding the base of said bulb and clamped between said partition and end of said transparent head, a flat reflecting surface provided on the face of said washer adjacent said bulb, an end cap threadedly mounted within the other end of said shell, a battery within said shell having a terminal in axial opposed relation to the contact end of said bulb, spring means seated on said partition and engaging the terminal carrying end of said battery to normally hold the same in spaced relation to the contact end of said bulb, said end cap being so constructed and arranged that relative inward movement of the same will move the battery into operative contact with said bulb to energize the same whereby to illuminate said transparent head.

3. The illuminated fish lure or bait as set forth in claim 2, wherein said transparent head is hollow and tapered to a relatively sharp point, an eye-bolt fixed to said point carrying a hook and a spinner whereby to be illuminated by light rays emanating from said electric light bulb.

4. The illuminated fish lure or bait as set forth in claim 2, wherein said reflecting surface on said shock absorbing washer is provided by a metal foil covering.

EUGENE H. BAILEY.